(12) United States Patent
Gazula et al.

(10) Patent No.: US 10,133,862 B1
(45) Date of Patent: Nov. 20, 2018

(54) TIMER AND CONTENT SECURITY

(71) Applicant: INTERNATIONAL BUSINESS MACHINES CORPORATION, Armonk, NY (US)

(72) Inventors: Jayanth V. Gazula, Downingtown, PA (US); Noah M. Ginsburg, West Chester, PA (US); Aaron J. Mondelblatt, Trappe, PA (US); Bryce Nichols, Philadelphia, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/590,373

(22) Filed: May 9, 2017

(51) Int. Cl.
| | |
|---|---|
| *G06F 21/46* | (2013.01) |
| *G06F 21/72* | (2013.01) |
| *G06F 21/36* | (2013.01) |
| *G06F 21/44* | (2013.01) |
| *G06F 21/60* | (2013.01) |

(52) U.S. Cl.
CPC .............. *G06F 21/46* (2013.01); *G06F 21/36* (2013.01); *G06F 21/445* (2013.01); *G06F 21/602* (2013.01); *G06F 21/725* (2013.01); *G06F 2217/84* (2013.01); *G06F 2221/2137* (2013.01)

(58) Field of Classification Search
None
See application file for complete search history.

(56) References Cited

U.S. PATENT DOCUMENTS

| | | | |
|---|---|---|---|
| 4,337,483 | A | 6/1982 | Guillou |
| 5,014,234 | A | 5/1991 | Edwards, Jr. |
| 5,586,186 | A | 12/1996 | Yuval et al. |
| 5,796,828 | A | 8/1998 | Tsukamoto et al. |
| 5,982,892 | A | 11/1999 | Hicks et al. |
| 6,603,857 | B1 | 8/2003 | Batten-Carew et al. |
| 6,721,784 | B1 | 4/2004 | Leonard et al. |
| 6,775,690 | B1 | 8/2004 | Creswell et al. |

(Continued)

OTHER PUBLICATIONS

IBM, "Assess on Cloud Release Notes Jun. 2016," IBM Kenexa® Assess on Cloud Jun. 2016 (5.5) Release, Jun. 18, 2016, p. 1-14, IBM Corporation, Grace Period Disclosure.

(Continued)

*Primary Examiner* — Kaveh Abrishamkar
(74) *Attorney, Agent, or Firm* — Erik K. Johnson

(57) ABSTRACT

A method, computer system, and a computer program product for timing secured content is provided. The present invention may include receiving a connection request from a user device. The present invention may also include generating a pass-phrase and a key based on the received connection request. The present invention may then include encrypting a data packet based on the generated pass-phrase and the generated key. The present invention may further include sending the encrypted data packet to the user device. The present invention may also include receiving a pass-phrase request from the user device. The present invention may then include sending the generated pass-phrase in response to receiving the pass-phrase request. The present invention may further include receiving a message to start a timer associated with the sent data packet. The present invention may also include starting the timer based on the received message to start the timer.

17 Claims, 5 Drawing Sheets

(56) References Cited

U.S. PATENT DOCUMENTS

| | | | |
|---|---|---|---|
| 7,321,660 B2 | 1/2008 | Mont et al. | |
| 7,849,016 B2 | 12/2010 | So | |
| 7,933,408 B2 | 4/2011 | Wong et al. | |
| 8,130,944 B2 | 3/2012 | Stork et al. | |
| 8,341,278 B2 | 12/2012 | Tewari et al. | |
| 8,510,226 B2 | 8/2013 | Coley et al. | |
| 9,185,094 B2* | 11/2015 | Ivanchykhin | H04L 63/108 |
| 9,648,088 B1 | 5/2017 | Pande et al. | |
| 2004/0139024 A1 | 7/2004 | So | |
| 2005/0071657 A1 | 3/2005 | Ryan | |
| 2013/0070924 A1* | 3/2013 | Bertin | H04N 13/0497 |
| | | | 380/211 |

OTHER PUBLICATIONS

Lui et al., "Time-Based Proxy Re-Encryption Scheme for Secure Data Sharing in a Cloud Environment," Information Sciences, Feb. 10, 2014, p. 355-370, vol. 258, Elsevier Inc.

Mell et al., "The NIST Definition of Cloud Computing," National Institute of Standards and Technology, Sep. 2011, p. 1-3, Special Publication 800-145.

Tang et al., "Secure Overlay Cloud Storage with Access Control and Assured Deletion," IEEE Transactions on Dependable and Secure Computing, Nov./Dec. 2012, p. 903-916, vol. 9, Issue 6, IEEE Computer Society.

IBM, "List of IBM Patents or Patent Applications Treated as Related (Appendix P)," Apr. 5, 2018, p. 1-2.

Gazula et al., "Timer and Content Security," Application and Drawings, Filed on Sep. 11, 2017, 29 Pages, U.S. Appl. No. 15/700,260.

\* cited by examiner

TIMER AND CONTENT SECURITY

STATEMENT REGARDING PRIOR DISCLOSURES BY THE INVENTOR OR A JOINT INVENTOR

Aspects of the present invention have been disclosed by the Applicant, who obtained the subject matter disclosed directly from the inventors, in the product IBM Kenexa® Assess on Cloud Version 5.5, made available to the public on Jun. 18, 2016. The following disclosure is submitted under 35 U.S.C. § 102(b)(1)(A).

BACKGROUND

The present invention relates generally to the field of computing, and more particularly to timers and content security.

A user's access time to secure content over a network may be displayed by unequal time distributions from user to user depending on variables such as a user's geographic location compared to the server and the user's network connection speed. A content timer may begin before the user device has completely downloaded the data, putting users with slower network connections at a disadvantage and conversely users with faster network connections at an advantage.

SUMMARY

Embodiments of the present invention disclose a method, computer system, and a computer program product for timing secured content. The present invention may include receiving a connection request from a user device. The present invention may also include generating a pass-phrase and a key based on the received connection request. The present invention may then include encrypting a data packet based on the generated pass-phrase and the generated key. The present invention may further include sending the encrypted data packet to the user device. The present invention may also include receiving a pass-phrase request from the user device. The present invention may then include sending the generated pass-phrase in response to receiving the pass-phrase request. The present invention may further include receiving a message to start a timer associated with the sent data packet. The present invention may also include starting the timer based on the received message to start the timer.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
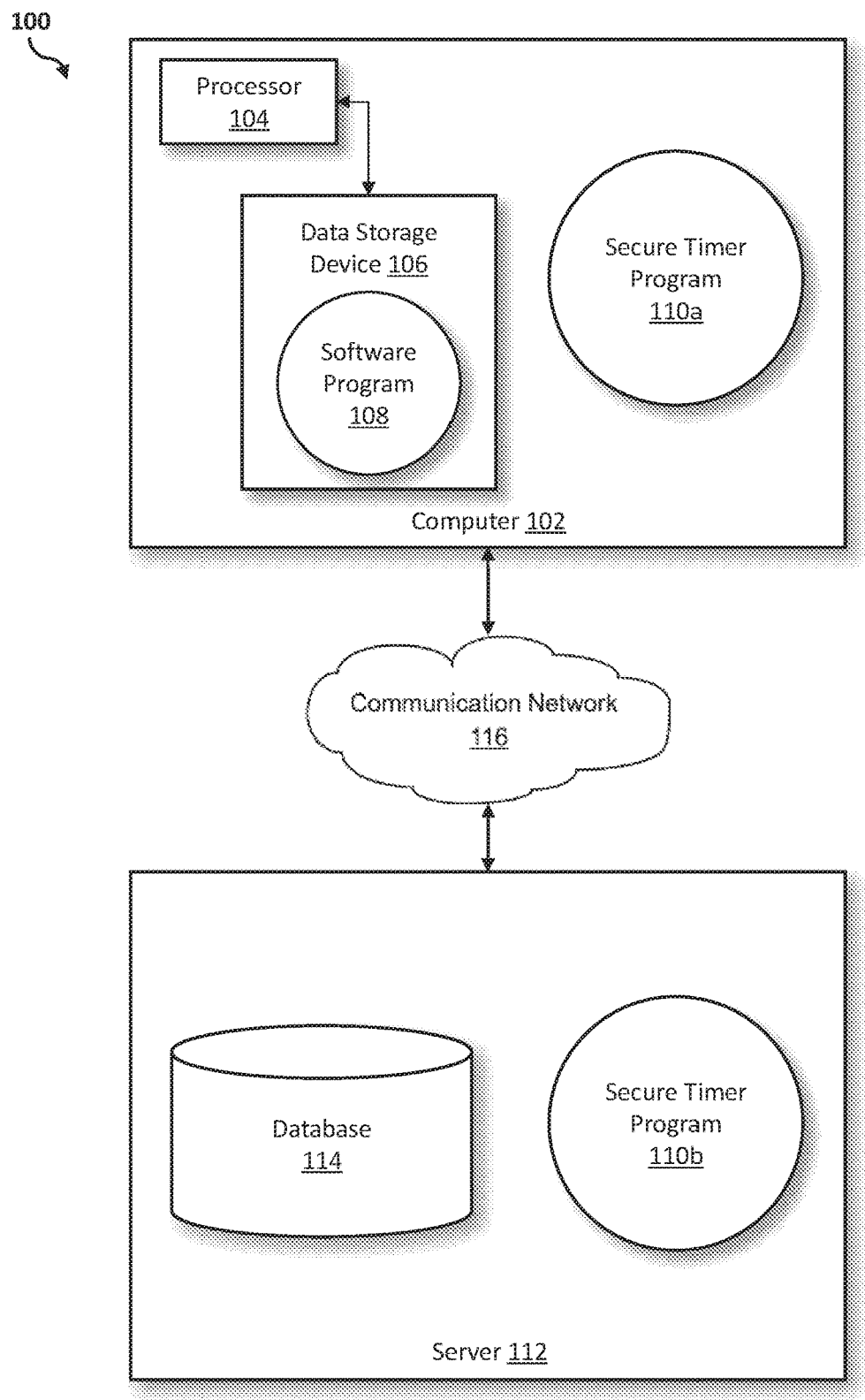
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for timing access to secure data. As such, the present embodiment has the capacity to improve the technical field of secure content timing by controlling the start time and the end time a user device (i.e., client device) may access secure content. More specifically, timing when a user may begin to access secure data may create an equal amount of time during which users may access the data regardless of the user's proximity to the server or the user's network connection speed. Additionally, an equal time window to access data may also be created by securing transmitted data that may not be decrypted with a passcode (i.e., unlocked with a pass-phrase) by the user device until the user device has received and downloaded the secure data. Once the user device has received and downloaded the secure data, the user device may then request a pass-phrase from the server. After the user device receives the pass-phrase to access the data, the timer may begin when the user device decrypts the data with the generated pass-phrase. A pass-phrase may consist of a way for the user to unlock the secured data, such as, by a passcode, password, or encryption key.

As previously described, a user's access time to secure content over a network may be displayed by unequal time distributions from user to user depending on variables such as a user's geographic location compared to the server and the user's network connection speed. A content timer may begin before the user device has completely downloaded the data (i.e., before the user is able to access the secure content), putting users with slower network connections at a disadvantage and conversely users with faster network connections at an advantage. In addition to timers, ensuring the decryption process takes place within a limited amount of time may further secure the transmitted data. Timing user access to data with encryption key accessibility may both allow equal time for users accessing content over a network and create a more secure data network.

Latency in a network connection may vary depending on a user's geographic location and the type of internet connection a user may have. Internet technology has made services such as automatically administered tests (e.g., knowledge and skills tests) available to users globally. Upon beginning a test administered over a communication network, a user may think equal time for the exam is given to each user taking the exam. More time may be given to a user viewing, interacting with or responding to the exam questions in cases where a user may have high speed internet. Consequentially, less time may be given to a user viewing, interacting with or responding to the exam questions in cases where a user may have a slow internet connection. One cause for the unequal distribution of time to exam takers may be from the test timer starting before the exam content is fully received and downloaded by the user device, giving more advanced user devices and fast internet technology devices an advantage over older and slower connections and devices.

For example, in a testing environment, to make the internet administered tests fair, each user should be allowed equal time to review the exam questions and provide responses. The disadvantage of a timer starting before the content is fully received, downloaded and decrypted by the user device is a test taking environment in which a user may have less time to answer an online exam question or less time to complete the entire exam. In addition to preventing the timer from beginning before the content is made available to a user, content security may be enhanced by preventing malicious attackers from gaining access to the content while the data is being transmitted by sending the non-persistent pass-phrase to the user device after the encrypted data packet has already been received and downloaded by the user device.

Another example of unequal timing amongst users may include a timer starting when the code is ready but the rest of the Document Object Model (DOM) may not be ready. In this case, a timer may have started and the user may see the timer ticking down but the user may not yet have full access to the data. In a case where the timer starts after the entire DOM is loaded, then a user with a slow network connection or a device using a proxy to manipulate web applications may use the application to complete a portion of a data test without the timer starting. In this example, by not allowing a user to access information before the browser has completely downloaded the data, the time allotted to each user may be equal.

Another timer and content security problem may arise due to the distributed nature of modern networked applications. A service provider may have limited guarantees associated with the end user's behavior, such as in a case that may require access to restricted data. Restricted data may allow a user to access the secured data for a finite time period or may require a user to respond within a specified time period. Therefore, it may be advantageous to, among other things, ensure a user has relevant access to secure data for the specified time period by commencing a timer on a task when the user may gain full access to the secure data. Additionally, data security may be enhanced by preventing malicious attackers from gaining access to content while the data is being transmitted by sending a pass-phrase or encryption key to the user device separately from the encrypted data packet and after the content is fully downloaded and ready to be accessed.

According to at least one embodiment, a secure timer program may display secure content presented on a web based application over a network for a predefined time period that may ensure an equal amount of time for each user to view the data, interact with the data or respond to the data. The objective may be to establish for each user a start time to coincide with the receipt of the contents so one user does not have an unfair advantage over another user due to variables such as geographic location and user network speed. Creating a timer start access time once the content is received, downloaded and able to be decrypted may allow the users to have access to the content for the same amount of time. The element of securing data may relate to the time in which an encrypted pass-phrase is used by the user device when the data is ready to be accessed (i.e., fully received and downloaded by user device).

The present embodiment may allow a user to have a fixed duration of access time to secure data. Providing an equal amount of time to access secure data to each user may include controlling the start time and the end time a user may view the data, interact with the data or respond to the data. Once the timer has run out, the user may not be able to view the data, interact with the data or a respond to the data. The timer limits a user's access and beginning the timer once a user can access the data may allow all users to have equal time to access secure data.

Timing of when a pass-phrase may be sent to a user device from a server may be near the time the pass-phrase may be used, such as after the encrypted content is received and downloaded by a user device. The timer may then begin after the secure content is fully downloaded and the user device gains access to the pass-phrase to unlock the contents. Starting the timer once the fully downloaded encrypted data packet is decrypted may allow each user an equal amount of time to access, interact with or respond to the data. Properly timing a user's access, responses or interactions with the secure content may remove the disadvantage of the user with a slow network connection, creating an equal time period during which each user may have access to secure data.

The present embodiment may also ensure that the secure data may be safeguarded against hack attempts by having the server send the encryption key (i.e., pass-phrase or passcode) at the time the data has been downloaded and is ready to be accessed by the user device. In addition to timing how long a user may be able to access the decrypted content, the secure timer program may ensure when data may be decrypted. Timing when data may be decrypted increases the security of the encrypted content by lessening the time the encryption key is accessible to the user device storing the encrypted data. A non-persistent encryption key may be associated with decrypting the encrypted data packet where the non-persistent key may not be saved on the user device or may be saved for a short period of time. Encrypted content may remain encrypted until a user accesses the pass-phrase to unlock the content. Encrypted data may be unlocked once the content is ready to be accessed by the user.

The present embodiment may not rely on predetermined times of the day to allow access to data, rather, the timer may begin the start time once the content is ready for viewing on the end-user's device, then access may be ended once the end time is reached. Once the timer has stopped, then the server may not receive any more user responses or interactions with the secure data. The content interaction may cease at the moment the timer stops. The secure timer program may or may not persist on a machine or the secure timer program may be associated with content being sent to a receiving machine. The present embodiment may not require installation of software on a user device or may not require a trial period for a given access period. The present embodiment may also be able to run the secure content timer program on a user device (e.g., computer) or a server.

The present embodiment provides a system and method to encrypt data, control the timing of decryption and enable the data to be presented to the user at the start time on the timer (i.e., providing a content escrow system for a client). This embodiment may transmit non-persistent data to an end user associated with a user device. Non-persistent data may not be available for a long time period, for example, upon restarting an application or after the data is made unavailable by a timer. The secure timer program may verify the response time of a user to ascertain if a user may be advantaged or disadvantaged by the beginning of the timer and by the amount of time allowed for the task.

The secure timer program may track access to data. Tracking access to data may include the time the data may be accessed, when the data may be decrypted and the duration of time the data may be accessible to the user. Encrypting the data and transmitting an encrypted data packet (i.e., secure content or data) may keep the data secure and inaccessible to any user or user device until properly decrypted. To decrypt, the secure timer program may send the pass-phrase to the user device once the data packet is downloaded on the user's device and ready to be decrypted. The secure timer program may then employ the timer once the contents have been decrypted by the user and the timer may continue to monitor access time by the user.

In the present embodiment, the timer may allow the end user access to data for a fixed interval of time. The timer may be implemented on a server and the timer may be displayed on the end user's device to give the user an approximation of how much time a user may view the data, interact with the data or respond to the data at a given moment. Alternatively, the timer may not be known to the user and may be hidden. The secure timer program may determine and control the extent of time a user may interact with the content or submit a response. Assuring a user access to content for a fixed interval of time notwithstanding a user's geographic location or network connection may create equal time access to the content to each user.

The present embodiment may use, for example, JavaScript® (JavaScript and all JavaScript-based trademarks and logos are trademarks or registered trademarks of Oracle Corporation and/or its affiliates) language. JavaScript® language may be made available to a majority of internet users and may have access to a web based browser with an interpreter, may require no specific hardware or may not require a pre-installed application on an end user device.

By using JavaScript®, a computer utility program that may be downloaded from a global computer network, and since JavaScript® is widely used around the world, the secure timer program may restrict an end user from circumventing the window of time restriction provided to access restricted data, interact with the data or to provide a response. When the server timer has finished, the secure timer program may restrict the user from further interaction with the content.

The secure timer program may use, for example, symmetric encryption such as the Advanced Encryption Standard (AES). Symmetric encryption may allow identical encryption keys shared between the server and user device or may allow a transformation between the encryption keys. The secure timer program may encrypt data at the server and the encrypted data may be transmitted to the user device (i.e., client device). While in transit, the encrypted data may be secure and the encrypted data may be unintelligible to an eavesdropper. Upon receiving the entire encrypted data packet, the user device may decrypt the data by generating an encryption key using the same pass-phrase used by the server. The secure timer program may then begin the timer on the server and begin counting down once the timer receives a message from the user device confirming the data packet has been decrypted. The time to send the confirmation message may be negligible.

According to another embodiment, the secure timer program may use the timer without encryption and decryption of data. For example, in a situation when a user accesses a test available to the general public, no encryption may be necessary. This case may allow proper timing methods even though the test may be free and available to the public. The secure timer program may begin the timer once confirmation is sent to the server from the user device that the unencrypted data packet has downloaded.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a secure timer program 110a. The networked computer environment 100 may also include a server 112 that is enabled to run a secure timer program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the secure timer program 110a, 110b may interact with a database 114 that may be embedded in various storage devices, such as, but not limited to a computer/mobile device 102, a networked server 112, or a cloud storage service.

According to the present embodiment, an individual using a client computer 102 or a server computer 112 may use the secure timer program 110a, 110b (respectively) to ensure a user may obtain access to secure data for a specified time period that may not be affected by geographic location or network connection speed. The content security and timer method is explained in more detail below with respect to FIG. 2.

Figure 2:
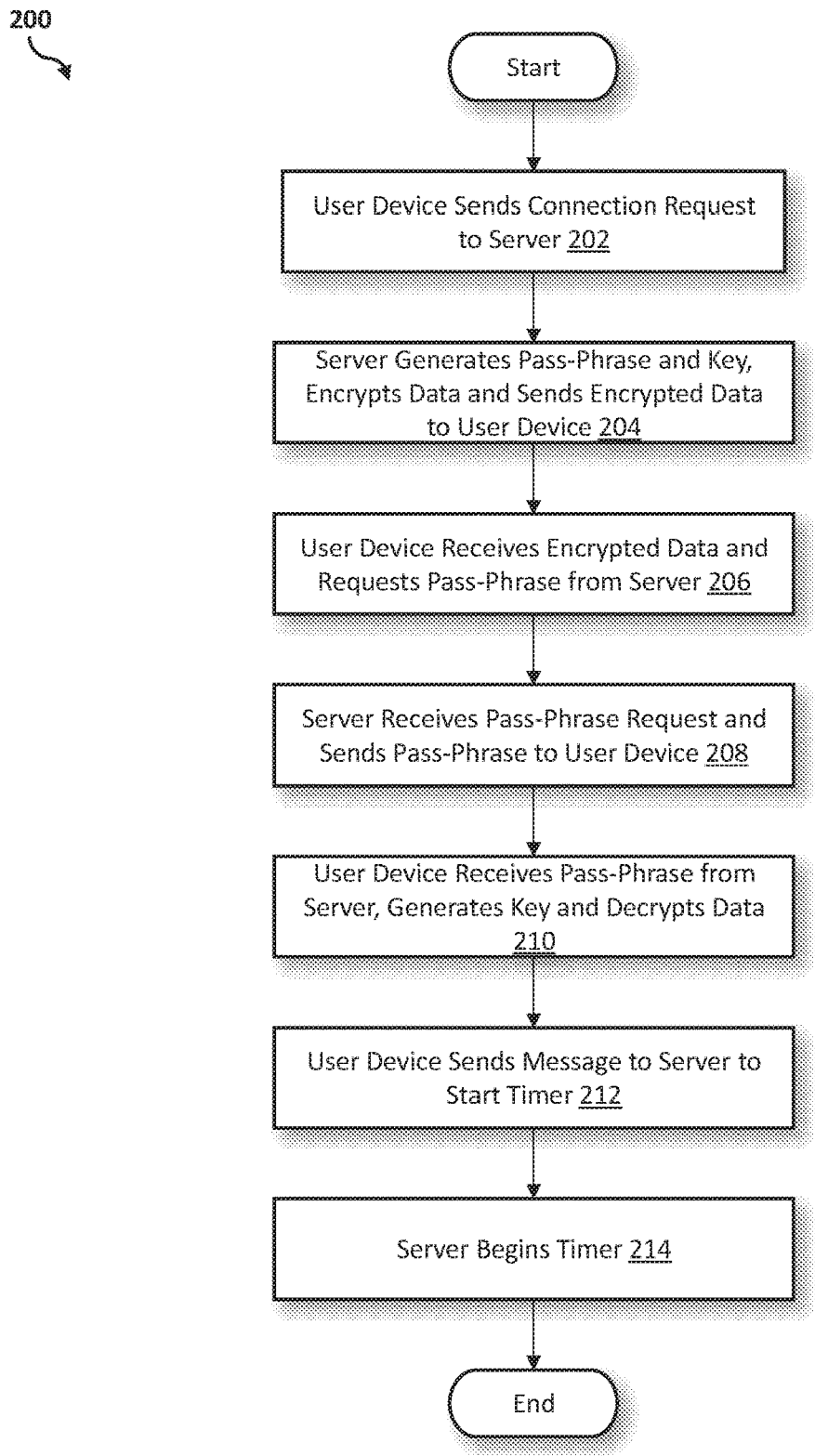
FIG. 2 is an operational flowchart illustrating a process for timing and securing content according to at least one embodiment.

Referring now to FIG. 2, an operational flowchart illustrating the exemplary timing and securing content process 200 used by the secure timer program 110a, 110b according to at least one embodiment is depicted.

At 202, the user device sends a connection request to the server 112. The user device may also be known as a client device or a computer 102. The user device may send the connection request over a communication network 116 using a web application on the user device (e.g., computer 102). The connection request may be sent using a Secure Sockets Layer (SSL) to establish a secure link between the server 112 and the user device. The connection request may include a request to access encrypted or unencrypted data either stored on a server 112 or accessible to a server 112. The access request may, for example, include a user device attempting to access a timed exam, tickets sales that may have a certain time limit in which to purchase or an online portal to pay a traffic ticket by a specific deadline.

Then at 204, the server 112 generates a pass-phrase and key, then encrypts the data and sends the encrypted data packet to the user device. The pass-phrase and the key may be generated via known algorithms. Advanced Encryption Standard (AES) may be used to create a dynamic pass-phrase on the server 112 for the requested or transmitted data. AES may include a symmetric encryption to allow for identical encryption keys to be shared between the server 112 and the user device (e.g., computer 102). The server 112, using the secure timer program 110*a*, 110*b*, may encrypt the data packet using an encryption key. The secure timer program 110*a*, 110*b* may create an encryption key that may be used to create a pass-phrase or passcode to unlock the secure encrypted data. A pass-phrase, for example, may be a password created by the secure timer program 110*a*, 110*b* to provide to a user device accessing the encrypted data packet. The secure timer program 110*a*, 110*b* may encrypt the data packet using either a persistent or a non-persistent type of encryption. Once encrypted, the server 112 may transmit the encrypted data packet to the user device.

Next, at 206, the user device receives the encrypted data packet from the server 112 and then requests the pass-phrase from the server 112. When the user device receives the encrypted data packet, the encrypted data packet may be fully downloaded before the user device sends the request for the pass-phrase from the server 112. The user device may wait until the encrypted data packet is fully downloaded before requesting a pass-phrase from the server 112 to prevent the timer from beginning before the encrypted data packet is fully downloaded. The user device may send the pass-phrase request to the server 112 once the encrypted data packet is ready to be decrypted or unlocked. The pass-phrase, being requested after the encrypted data packet is downloaded, may allow slower devices or connections the same allotted time frame to view the data, interact with the data or respond to the data as a faster user device or network connection. Additionally, sending the pass-phrase request, by the user device, to the server 112, in a separate request, may further secure the encrypted data packet since the pass-phrase and the encrypted data packet may not be in the same transmission. For example, the user device may create an Asynchronous JavaScript® and Extensible Markup Language (XML), also known as AJAX, call once the web page loads the contents of the encrypted data packet to get the pass-phrase from the server 112.

Then at 208, the server 112 receives the pass-phrase request from the user device and sends the pass-phrase to the user device. Once the user device (e.g., computer 102) has received and downloaded the encrypted data packet, the user device may request the pass-phrase to unlock the encrypted data packet from the server 112. The secure timer program 110*a*, 110*b* may time the pass-phrase request from the user device to the server 112 to be after the encrypted data packet has been downloaded on the user device. Upon receiving the request, the server 112 may immediately send the pass-phrase, generated previously at 204, to the user device. The pass-phrase may, for example, be a password sent to the user device to unlock the encrypted data packet that has been downloaded on the user device. The pass-phrase may allow the user to access the encrypted data packet sent by the server 112 and to view the data, interact with the data or respond to the data within the allotted time frame, providing an equal amount of time for each user.

Next, at 210, the user device receives the pass-phrase from the server 112, generates a key and decrypts the data. Upon receiving the pass-phrase from the server 112, the user device may generate an encryption key associated with the received pass-phrase. The user device may then decrypt the encrypted data packet that has previously been downloaded. Once the secure data is decrypted, the user device may send a message to begin the timer on the server 112 and allow the user access to the secure data.

Then at 212, the user device sends a message to the server 112 to start the timer. Upon decrypting the fully downloaded encrypted data packet, the user device may immediately send a message to the server 112 to begin the timer. The timer beginning after the encrypted data packet has been fully downloaded may allow each user device accessing the data to have the same amount of allocated time without unequal time distribution. The time transmitting the message to begin the timer sent from the user device to the server 112 may be negligible.

At 214, the server 112 begins the timer. When the server 112 receives the message from the user device to begin the timer, the server 112 may immediately start the timer. The timer may count down until there is no time left. Once the time associated with the timer has run out, the user device may no longer have access to the secure data, may no longer have the ability to interact with the data and may no longer respond to any data. The user device may show a timer counting down or the server 112 may hide the timer from the user device. The timer may act as a moderator of the duration of time the user may have access to the content. Once the time has elapsed, the user may no longer be allowed to submit a response based on the decrypted content.

One example of the secure timer program 110*a*, 110*b* use may include a user being allotted a specific amount of time to interact with or respond to restricted data when the restricted data is associated with an online exam which the user may have 2 hours to complete. The restricted data (i.e., encrypted data) may include media files, audio files, text files or other types of data that may be relevant to the exam. Once the user has accessed the exam, the secure timer program 110*a*, 110*b* may check to determine if the user can still view the content and if the user can no longer view the content, the content may be removed. Once the timer is finished, the user may no longer be able to send a response to the server (i.e., provide an answer). Another example may include a deadline for paying a fee online. An additional example may include a user having access to a window for a limited amount of time to purchase tickets (e.g., concert tickets, sporting event tickets, or any ticket that may require limited seating).

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
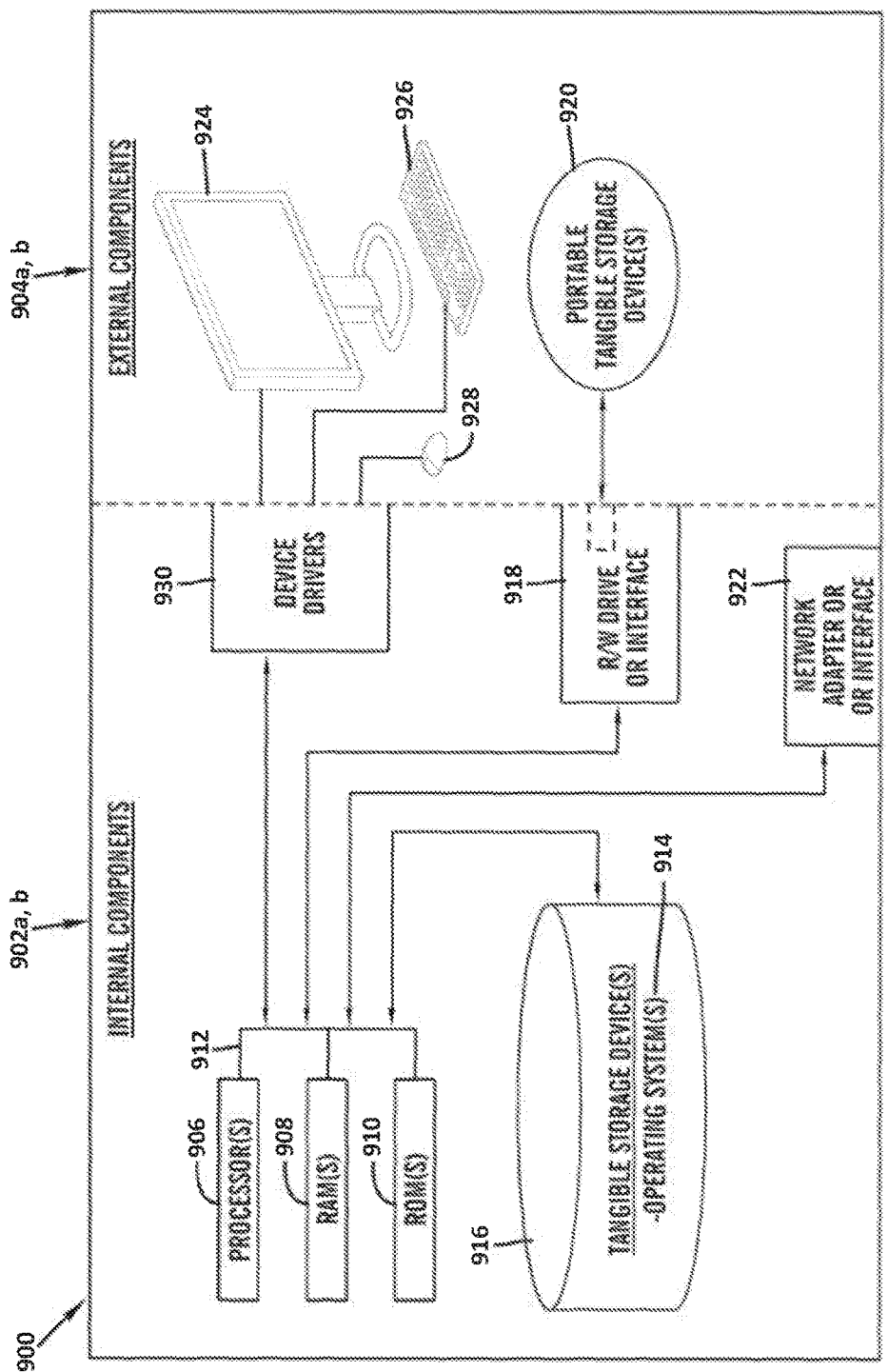
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server 112 computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 3. Each of the sets of internal components 902 *a, b* includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the secure timer program 110*a* in client computer 102, and the secure timer program 110*b* in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the secure timer program 110*a*, 110*b* can be stored on one or more of the respective portable computer-readable tangible storage devices 920, read via the respective R/W drive or interface 918, and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the secure timer program 110*a* in client computer 102 and the secure timer program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the secure timer program 110*a* in client computer 102 and the secure timer program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
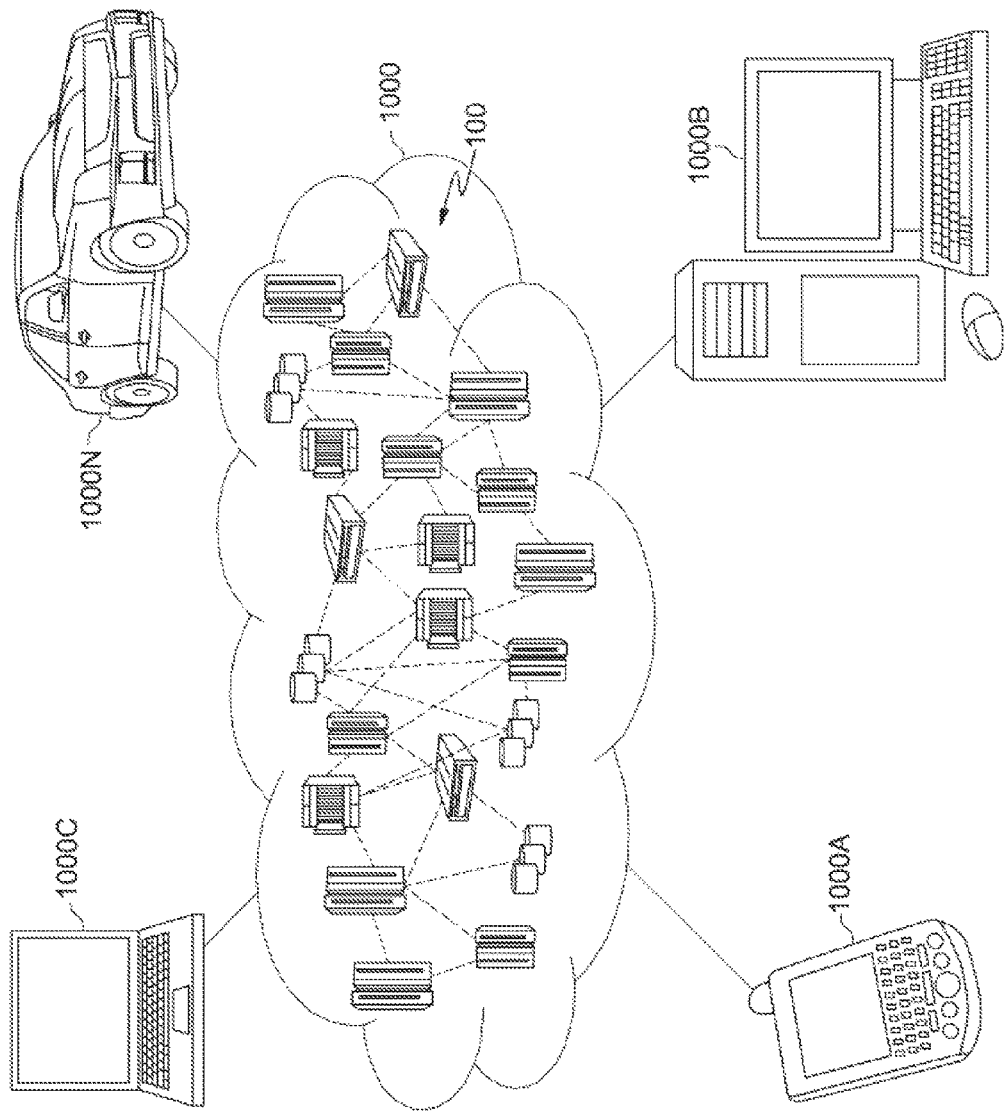
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
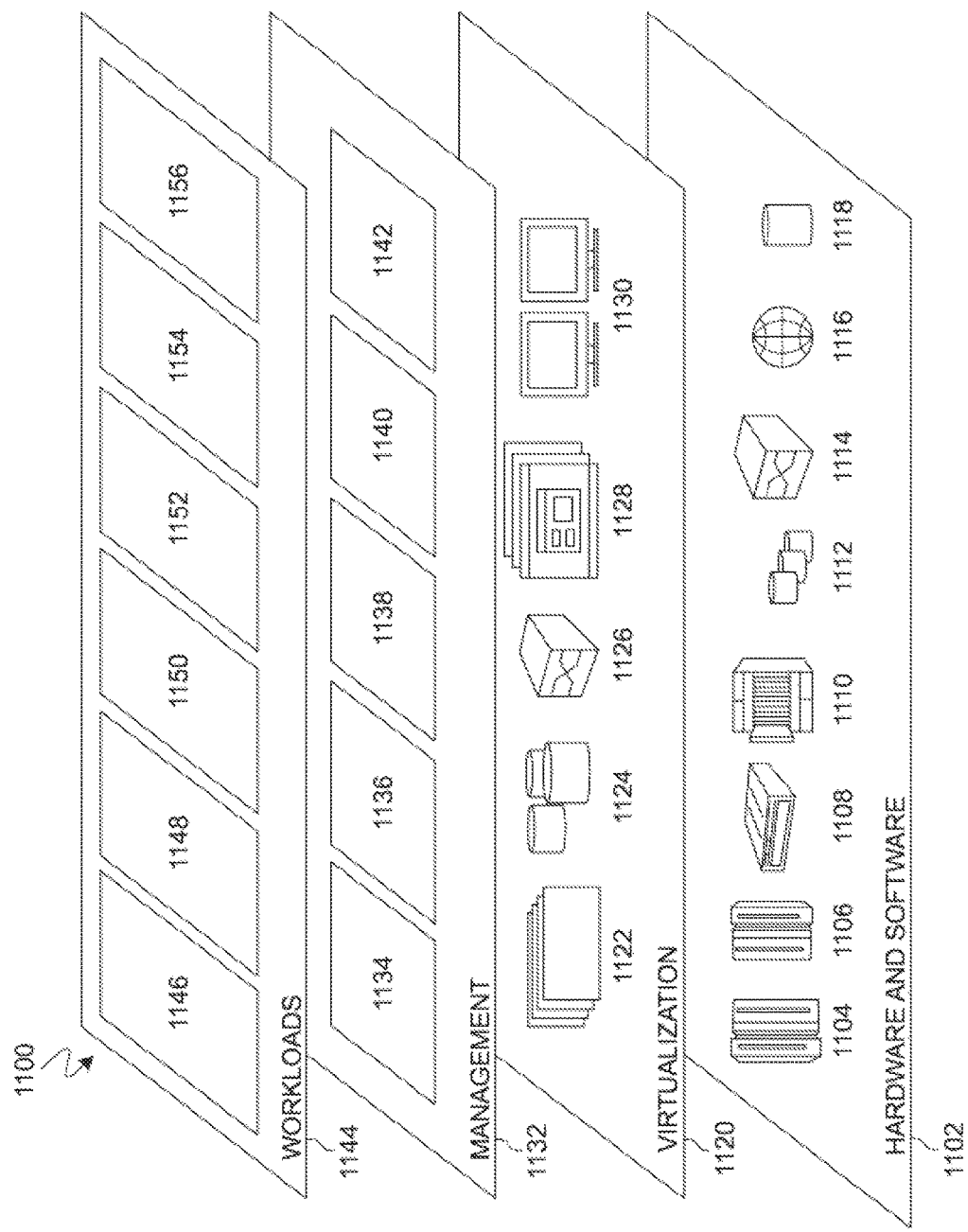
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and timing and securing content 1156. A secure timer program 110a, 110b provides a way to secure and create an equal time range during which users of different network connections may access secure content.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for timing secured content, the method comprising:
   receiving a connection request from a user device;
   generating a pass-phrase and a key based on the received connection request;
   encrypting a data packet based on the generated pass-phrase and the generated key;
   sending the encrypted data packet to the user device, wherein the encrypted data packet completes a downloading process on the user device before the user device requests a pass-phrase, and wherein the completed downloading process prevents a timer from beginning before the encrypted data packet is fully downloaded;
   receiving the pass-phrase request from the user device;
   sending the generated pass-phrase in response to receiving the pass-phrase request;
   receiving a message to start the timer associated with the sent data packet; and
   starting the timer based on the received message to start the timer.

2. The method of claim 1, further comprising:
   receiving, by the user device, the sent encrypted data packet from the server;
   receiving, by the user device, the sent generated pass-phrase from the server; and
   decrypting, by the user device, the encrypted data packet based on the received generated pass-phrase.

3. The method of claim 1, wherein the pass-phrase is transmitted in a separate transmission than the encrypted data packet.

4. The method of claim 1, wherein access to the data packet invalidates the user device interaction when the timer runs out of time.

5. The method of claim 1, wherein the timer begins when the user device sends the message to the server to start the timer.

6. The method of claim 1, wherein the timer is used for an unencrypted data packet, and wherein once the user device downloads the unencrypted data packet, the user device sends a message to the server to begin the timer.

7. A computer system for timing secured content, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving a connection request from a user device;
   generating a pass-phrase and a key based on the received connection request;
   encrypting a data packet based on the generated pass-phrase and the generated key;
   sending the encrypted data packet to the user device, wherein the encrypted data packet completes a downloading process on the user device before the user device requests a pass-phrase, and wherein the completed downloading process prevents a timer from beginning before the encrypted data packet is fully downloaded;
   receiving the pass-phrase request from the user device;
   sending the generated pass-phrase in response to receiving the pass-phrase request;
   receiving a message to start the timer associated with the sent data packet; and
   starting the timer based on the received message to start the timer.

8. The computer system of claim 7, further comprising:
   receiving, by the user device, the sent encrypted data packet from the server;
   receiving, by the user device, the sent generated pass-phrase from the server; and
   decrypting, by the user device, the encrypted data packet based on the received generated pass-phrase.

9. The computer system of claim 7, wherein the pass-phrase is transmitted in a separate transmission than the encrypted data packet.

10. The computer system of claim 7, wherein access to the data packet invalidates the user device interaction when the timer runs out of time.

11. The computer system of claim 7, wherein the timer begins when the user device sends the message to the server to start the timer.

12. The computer system of claim 7, wherein the timer is used for an unencrypted data packet, and wherein once the user device downloads the unencrypted data packet, the user device sends a message to the server to begin the timer.

13. A computer program product for timing secured content, comprising:
   one or more computer-readable non-transitory storage medium and program instructions stored on at least one of the one or more tangible, non-transitory storage medium, the program instructions executable by a processor, the program instructions comprising:
   program instructions to receive a connection request from a user device;
   program instructions to generate a pass-phrase and a key based on the received connection request;
   program instructions to encrypt a data packet based on the generated pass-phrase and the generated key;
   program instructions to send the encrypted data packet to the user device, wherein the encrypted data packet completes a downloading process on the user device before the user device requests a pass-phrase, and wherein the completed downloading process prevents a timer from beginning before the encrypted data packet is fully downloaded;
   program instructions to receive the pass-phrase request from the user device;
   program instructions to send the generated pass-phrase in response to receiving the pass-phrase request;
   program instructions to receive a message to start the timer associated with the sent data packet; and
   program instructions to start the timer based on the received message to start the timer.

14. The computer program product of claim 13, further comprising:
   program instructions to receive, by the user device, the sent encrypted data packet from the server;
   program instructions to receive, by the user device, the sent generated pass-phrase from the server; and
   program instructions to decrypt, by the user device, the encrypted data packet based on the received generated pass-phrase.

15. The computer program product of claim 13, wherein the pass-phrase is transmitted in a separate transmission than the encrypted data packet.

16. The computer program product of claim 13, wherein access to the data packet invalidates the user device interaction when the timer runs out of time.

17. The computer program product of claim 13, wherein the timer is used for an unencrypted data packet, and wherein once the user device downloads the unencrypted data packet, the user device sends a message to the server to begin the timer.

\* \* \* \* \*